US012646941B2

(12) United States Patent
Wang et al.

(10) Patent No.: US 12,646,941 B2
(45) Date of Patent: Jun. 2, 2026

(54) METHOD FOR QUANTIFYING AND ASSESSING SCHEDULING RISK AND APPARATUS

(71) Applicants: TSINGHUA UNIVERSITY, Beijing (CN); STATE GRID JIBEI ELECTRIC POWER COMPANY, Beijing (CN); STATE GRID BEIJING ELECTRIC POWER COMPANY, Beijing (CN); STATE GRID CORPORATION OF CHINA, Beijing (CN)

(72) Inventors: Bin Wang, Beijing (CN); Guannan Wang, Beijing (CN); Wenchuan Wu, Beijing (CN); Jun Zhang, Beijing (CN); Hongbin Sun, Beijing (CN); Haitao Liu, Beijing (CN); Qi Wang, Beijing (CN); Yanna Xi, Beijing (CN); Jing Xing, Beijing (CN); Ziang Liu, Beijing (CN); Hongyu Zhang, Beijing (CN); Jinhe Zhang, Beijing (CN)

(73) Assignees: TSINGHUA UNIVERSITY, Beijing (CN); STATE GRID JIBEI ELECTRIC POWER COMPANY, Beijing (CN); STATE GRID BEIJING ELECTRIC POWER COMPANY, Beijing (CN); STATE GRID CORPORATION OF CHINA, Beijing (CN)

( * ) Notice: Subject to any disclaimer, the term of this patent is extended or adjusted under 35 U.S.C. 154(b) by 600 days.

(21) Appl. No.: 18/300,497

(22) Filed: Apr. 14, 2023

(65) Prior Publication Data

US 2024/0136816 A1 Apr. 25, 2024

(30) Foreign Application Priority Data

Oct. 10, 2022 (CN) .......................... 202211234001.3

(51) Int. Cl.
| | |
|---|---|
| *H02J 3/00* | (2026.01) |
| *H02J 103/30* | (2026.01) |
| *H02J 103/35* | (2026.01) |

(52) U.S. Cl.
CPC .......... *H02J 3/003* (2020.01); *H02J 2103/30* (2026.01); *H02J 2103/35* (2026.01)

(58) Field of Classification Search
CPC ..... H02J 3/003; H02J 2203/10; H02J 2203/20
(Continued)

(56) References Cited

U.S. PATENT DOCUMENTS

2019/0347670 A1* 11/2019 Abramson ............. G06N 5/027
2022/0385064 A1* 12/2022 Cruickshank, III .... H02J 3/003

* cited by examiner

*Primary Examiner* — Mohammad Ali
*Assistant Examiner* — Saad M Kabir
(74) *Attorney, Agent, or Firm* — Hodgson Russ LLP

(57) ABSTRACT

A method for quantifying and assessing a scheduling risk considering source load fluctuation and rescheduling, and an apparatus for quantifying and assessing a scheduling risk considering source load fluctuation and rescheduling are provided. The method includes establishing a scene set considering a new energy disturbance; establishing and solving a rescheduling optimization model considering the new energy disturbance in each scene based on a preset scheduling plan according to the scene set, so as to obtain a solving result of the rescheduling optimization model; and calculating a risk quantifying and assessing result corresponding to the preset scheduling plan according to the solving result of the rescheduling optimization model.

11 Claims, 1 Drawing Sheet

(58) Field of Classification Search
USPC ......................................................... 700/291
See application file for complete search history.

Step 1): establishing a scene set considering a new energy disturbance

Step 2): obtaining a rescheduling optimization solving result considering the new energy disturbance in each scene based on a preset scheduling plan according to the scene set established Step 3): calculating a risk quantifying and assessing result corresponding to the preset scheduling plan according to the rescheduling optimization solving result obtained

METHOD FOR QUANTIFYING AND ASSESSING SCHEDULING RISK AND APPARATUS

CROSS-REFERENCE TO RELATED APPLICATION

This application claims priority to Chinese Patent Application No. 202211234001.3, filed Oct. 10, 2022, the entire disclosure of which is incorporated herein by reference.

FIELD

The present disclosure relates to a field of quantification and assessment of a power system, and more particularly to a method for quantifying and assessing a scheduling risk considering source load fluctuation and rescheduling, and an apparatus for quantifying and assessing a scheduling risk considering source load fluctuation and rescheduling.

BACKGROUND

In traditional power analysis systems, the main reasons that cause the uncertainty of the power system are load fluctuations, changes in operation status of a power grid, and outage of a generator. With the continuous development of the power industry, new energy sources, mainly solar and wind energy, are connected to the power grid, which brings new uncertainties to the power grid. In recent years, the carbon peaking and carbon neutrality goals and the new power system are proposed, which promote the further development of new energy. The popularity of the new power system has increased year by year, which is gradually replacing the dominant position of the traditional systems. With the increase of the installed capacity of the new energy system, the uncertainty and the volatility in the power grid occur the double-side of source and load instead of the load side, which brings greater planning difficulties and challenges to the power grid, and increases the risk of the safe significantly. Thus, it is required to evaluate a scheduling risk to ensure the stable operation of the power system. However, the traditional assessing method cannot reflect randomness of the new energy output. Therefore, it is required to study a risk index quantifying method considering the uncertainty of the wind power and photovoltaic power output, so as to facilitate the formulation of a power grid operation scheduling plan and assist the dispatchers in decision-making.

SUMMARY

In order to solve at least one of the problems existing in the related art to at least some extent, the present disclosure provides a method for quantifying and assessing a scheduling risk considering source load fluctuation and rescheduling, and an apparatus for quantifying and assessing a scheduling risk considering source load fluctuation and rescheduling.

According to a first aspect of embodiments of the present disclosure, a method for quantifying and assessing a scheduling risk considering source load fluctuation and rescheduling is provided. The method includes establishing a scene set considering a new energy disturbance; establishing and solving a rescheduling optimization model considering the new energy disturbance in each scene based on a preset scheduling plan according to the scene set, so as to obtain a solving result of the rescheduling optimization model; and calculating a risk quantifying and assessing result corresponding to the preset scheduling plan according to the solving result of the rescheduling optimization model.

In some embodiments, establishing the scene set considering the new energy disturbance includes sampling a new energy output according to a distribution probability of the new energy output to obtain a sampling result; obtaining at least one scene by superimposing the sampling result as a disturbance and a historical prediction value of the new energy output; and determining the at least one scene as the scene set considering the new energy disturbance.

In some embodiments, the rescheduling optimization model considering the new energy disturbance consists of an objective function and a constraint condition. The objective function is used to minimize a sum of an operation cost and a regulation cost in a current scene. The constraint condition comprises a power balance constraint, a load shedding constraint, a network security constraint, a plant output constraint and a ramp constraint of an AGC plant.

In some embodiments, the objective function is expressed by:

$$\min\left\{ \sum_{t=1}^{T} \sum_{g \in G^T} C_{g,t}\left(P_{g,t}^T\right) + \sum_{t=1}^{T} \sum_{w \in G^{NE}} C_{w,t}\left(P_{w,t}^{NE,cut}\right) + \sum_{t=1}^{T} \sum_{ld \in L} C_{ld,t}\left(L_{ld,t}^{cut}\right) \right\}$$

where T represents a total number of periods, $G^T$ represents a collection of traditional plants in a power system, $G^{NE}$ represents a collection of new energy plants comprising wind power plants and photovoltaic power plants in the power system, L represents a load collection in the power system, $$P_{g,t}^T$$

represents an output of a $g^{th}$ traditional plant during a t period, $$P_{w,t}^{NE,cut}$$

represents a value of abandoned wind or light of a $w^{th}$ new energy plant during the t period, $$L_{ld,t}^{cut}$$

represents a cut-off value of a $ld^{th}$ load during the t period, $$C_{g,t}\left(P_{g,t}^T\right)$$

represents a cost function of the output of the $g^{th}$ traditional plant during the t period, $$C_{w,t}\left(P_{w,t}^{NE,cut}\right)$$

represents a cost function of the abandoned wind or light of the $w^{th}$ new energy plant during the t period, and $$C_{ld,t}\left(L_{ld,t}^{cut}\right)$$

represents a cost function of load shedding of the $ld^{th}$ load during the t period.

$$C_{g,t}\left(P_{g,t}^{T}\right) = a_{g,t}\left(P_{g,t}^{T}\right)^{2} + b_{g,t}P_{g,t}^{T} + c_{g,t}$$

$$C_{w,t}\left(P_{w,t}^{NE,cut}\right) = k_{nec}P_{w,t}^{NE,cut}$$

$$C_{ld,t}\left(L_{ld,t}^{cut}\right) = k_{lc}L_{ld,t}^{cut}$$

where $a_{g,t}$ represents a quadratic term coefficient of the cost function of the output of the $g^{th}$ traditional plant during the t period, $b_{g,t}$ represents a primary term coefficient of the cost function of the output of the $g^{th}$ traditional plant during the t period, $c_{g,t}$ represents a constant term coefficient of the cost function of the output of the $g^{th}$ traditional plant during the t period, $k_{nec}$ represents a cost coefficient of abandoned wind or light, and $k_{lc}$ is a cost coefficient of load shedding.

In some embodiments, the power balance constraint is expressed by:

$$\sum\nolimits_{g \in G^{T}} P_{g,t}^{T} + \sum\nolimits_{w \in G^{NE}} P_{w,t}^{NE,real} - \sum\nolimits_{w \in G^{NE}} = \sum\nolimits_{ld \in L} L_{ld,t} - \sum\nolimits_{ld \in L} L_{ld,t}^{cut}$$

where $$P_{w,t}^{NE,real}$$

represents an actual output of the $w^{th}$ new energy plant in the current scene during the t period, $$P_{w,t}^{NE,cut}$$

represents an amount of wind and light abandoned by the $w^{th}$ new energy plant during the t period, and $L_{ld,t}$ represents an initial load value of the $ld^{th}$ load during the t period.

The load shedding constraint is expressed by:

$$0 \leq L_{ld,t}^{cut} \leq L_{ld,t};$$

the network security constraint is expressed by:

$$-P_{l}^{max} \leq G_{l-u}P_{u,t} - G_{-ld}\left(L_{ld,t} - L_{ld,t}^{cut}\right) \leq P_{l}^{max}$$

where $$P_{l}^{max}$$

represents a line active power flow capacity of a line l, $P_{u,t}$ represents an output of a plant u during a t period, wherein the plant u comprises a traditional plant and a new energy plant, $G_{l-u}$ represents a generation transfer distribution factor of the plant u to the line l, and $G_{l-ld}$ represents a power transmission transfer distribution factor of the $ld^{th}$ load to the line l.

The plant output constraint is expressed by:

$$P_{g,min}^{T,AGC} \leq P_{g,t}^{T,AGC} \leq P_{g,max}^{T,AGC}$$

$$0 \leq P_{w,t}^{NE,real} - P_{w,t}^{NE,cut} \leq P_{w,t,max}^{NE,sche}$$

where $$P_{g,min}^{T,AGC}$$

represents a lower limit of the output of the $g^{th}$ AGC plant in the traditional plant, $$P_{g,max}^{T,AGC}$$

represents an upper limit of the output of the $g^{th}$ AGC plant in the traditional plant, wherein non-AGC plants in the traditional plant output a power according to the preset scheduling plan, and $$P_{w,t,max}^{NE,sche}$$

represents an upper limit of a new energy output of the $w^{th}$ new energy plant during the t period in the preset scheduling plan.

The ramp constraint of the AGC plant is expressed by:

$$RD_{g}^{T,AGC} \leq P_{g,t}^{T,AGC} - P_{g,t-1}^{T,AGC} \leq RU_{g}^{T,AGC}$$

where $$RD_{g}^{T,AGC}$$

represents a down ramping maximum of the $g^{th}$ AGC plant, and $$RU_{g}^{T,AGC}$$

represents an up ramping maximum of the $g^{th}$ AGC plant.

In some embodiments, the solving result of the rescheduling model comprises optimal solutions of $$P_{l,t}, P_{w,t}^{NE,cut}, L_{ld,t}^{cut} \text{ and } P_{g,t}^{T}$$

5 in the current scene, where $P_{l,t}$ represents a line power flow of the line 1 during the t period.

In some embodiments, calculating the risk quantifying and assessing result corresponding to the scheduling plan according to the solving result of the rescheduling optimization model includes:

1) calculating a risk index of wind and light abandonment by:

$$R_{necut,t} = \sum_{n=1}^{M} \frac{1}{M} Ser^{necut}(\sum_{w \in G^{NE}} (P_{w,t}^{necut,n}))$$

where M represents a total number of scenes in the scene set, $$P_{w,t}^{necut,n}$$

represents an amount of wind and light abandoned by the $w^{th}$ new energy plant during the t period in a scene n; $R_{necut,t}$ represents a risk index of wind and light abandonment during the t period, and $Ser^{necut,t}(\bullet)$ represents a severity of wind and light abandonment;

in which a severity of wind and light abandonment of the $w^{th}$ new energy plant during the t period in the scene n is expressed by:

$$Ser^{necut}(\sum_{w \in G^{NE}} (P_{w,t}^{necut,n})) = k_{nec} \sum_{w \in G^{NE}} (P_{w,t}^{necut,n})$$

2) calculating a risk index of load shedding by:

$$R_{cut,t} = \Sigma_{n=1}^{M} \frac{1}{M} Ser^{cut}(L_{cut,t}^{n})$$

where $$L_{cut,t}^{n}$$

represents a load shedding amount during the t period in the scene n, $R_{cut,t}$ represents a risk index of load shedding during the t period, and $Ser^{cut}(\bullet)$ represents a severity of load shedding;

in which a severity of load shedding during the t period in the scene n is expressed by:

$$Ser^{cut}(L_{cut,t}^{n}) = k_{lc} L_{cut,t}^{n}$$

3) calculating a risk index of backup shortage by; assuming that a maximum value of the output of the $g^{th}$ traditional plant during the t period is:

$$P_{g,t}^{T,max} = \min(P_{g}^{T,max}, P_{g,t-1}^{T} + RU_g \cdot t_0)$$

6 a minimum value of the output of the $g^{th}$ traditional plant during the t period is:

$$P_{g,t}^{T,min} = \max(P_{g}^{T,min}, P_{g,t-1}^{T} - RD_g \cdot t_0)$$

where $$P_{g,t}^{T,max}$$

represents the maximum value of the output of the $g^{th}$ traditional plant during the t period, $$P_{g,t}^{T,min}$$

represents the minimum value of the output of the $g^{th}$ traditional plant during the t period, $$P_{g}^{T,max}$$

represents a maximum value of an output requirement of the $g^{th}$ traditional plant, $$P_{g}^{T,min}$$

represents a minimum value of the output requirement of the $g^{th}$ traditional plant, $RU_g$ represents an up ramping capacity of the $g^{th}$ traditional plant, $RD_g$ represents a down ramping capacity of the $g^{th}$ traditional plant, and $t_0$ represents a time interval between two adjacent time points;

calculating a total amount of positive backups and negative backups in the power system during the t period according to $$P_{g,t}^{T,max} \text{ and } P_{g,t}^{T,min}$$

in each plant by:

$$RE_t^{pos} = \sum_{g=1}^{N_g} (P_{g,max}^{T,AGC} - P_{g,t}^{T,AGC})$$

$$RE_t^{neg} = \sum_{g=1}^{N_g} (P_{g,t}^{T,AGC} - P_{g,min}^{T,AGC})$$

where $$RE_t^{pos}$$

represents a total amount of positive backups in the power system during the t period, $$RE_t^{neg}$$

represents a total amount of negative backups in the power system during the t period, and $N_g$ represents a total number of AGC plants in the power system; then $$R_{RE,t}^{pos} = \sum_{n=1}^{M} \frac{1}{M} B_{rep,t}^n (RE_t^{pos,n}) Ser^{rep} (RE_t^{pos,n})$$

$$R_{RE,t}^{neg} = \sum_{n=1}^{M} \frac{1}{M} B_{ren,t}^n (RE_t^{neg,n}) Ser^{ren} (RE_t^{neg,n})$$

where $$B_{rep,t}^n (RE_t^{pos,n})$$

represents a first flag of positive backup shortage during the t period in the scene n, $$B_{ren,t}^n (RE_t^{neg,n})$$

represents a second flag of negative backup shortage during the t period in the scene n, each of the first flag and the second flag being specified as 1 in case of backup shortage, otherwise, as 0;

$$R_{RE,t}^{pos}$$

represents a risk index of positive backup shortage during the t period, $$R_{RE,t}^{neg}$$

represents a risk index of negative backup shortage during the t period, $Ser^{rep}(\bullet)$ represents a severity of positive backup shortage, and $Ser^{ren}(\bullet)$ represents a severity of negative backup shortage;
in which a severity of positive backup shortage during the t period in the scene n is represented by:

$$Ser^{rep}(RE_t^{pos,n}) = k_{rep}(rep_0 - RE_t^{pos,n})$$

in which a severity of negative backup shortage during the t period in the scene n is represented by:

$$Ser^{ren}(RE_t^{neg,n}) = k_{ren}(ren_0 - RE_t^{neg,n})$$

where $rep_0$ represents a threshold value of positive backup sufficiency of the power system, $ren_0$ represents a threshold value of negative backup sufficiency of the power system, $k_{rep}$ represents a cost coefficient of positive backups, and $k_{ren}$ represents a cost coefficient of negative backups;

4) calculating a ramping risk index by:

$$R_{ramp}^{up} = \sum_{n=1}^{M} \frac{1}{M} B_{Rup,t}^n Ser^{rampup}$$

$$R_{ramp}^{dn} = \sum_{n=1}^{M} \frac{1}{M} B_{Rdn,t}^n Ser^{rampdn}$$

where $$B_{Rup,t}^n$$

represents a first marking variable of an up ramping risk during the t period in the scene n, and $$B_{Rdn,t}^n$$

represents a second marking variable of a down ramping risk during the t period in the scene n, each of the first marking variable and the second marking variable being specified as 1 in case that a ramping risk occurs, otherwise, as 0;

$$R_{ramp}^{up}$$

represents a risk index of the up ramping risk during the t period, and $$R_{ramp}^{dn}$$

represents a risk index of the down ramping risk during the t period; $Ser^{rampup}$ represents a severity of up ramping, and $Ser^{rampdn}$ represents a severity of down ramping,
in which a severity of up ramping during the t period in the scene n is expressed by:

$$Ser^{rampup} = k_{RU}(-WL_t^n - RU)$$

a severity of down ramping during the t period in the scene n is expressed by:

$$Ser^{rampdn} = k_{RD}(WL_t^n - RD))$$

where RU represents a maximum capability of up ramping of the power system, RD represents a maximum capability of down ramping of the power system, $k_{RU}$ represents a cost coefficient of up ramping, and $k_{RU}$ represents a cost coefficient of down ramping;

$$WL_t^n$$

represents a scene imbalance amount during the t period in the scene n, and is expressed by:

$$WL_t^n = \sum_{w \in G^{NE}} \left( P_{w,t}^{NE,real} - P_{w,t-1}^{NE,real} \right) +$$

$$\sum_{g \in G^T} \left( P_{g,t}^T - P_{g,t-1}^T \right) - \sum_{ld \in L} \left( L_{ld,t} - L_{ld,t-1} \right)$$

5) calculating an overline risk of a line power flow by:

$$R_{l,t}^{ol} = \sum_{n=1}^{M} \frac{1}{M} B_{l,t}^n \left( P_{l,t}^n \right) Ser^{ol} \left( P_{l,t}^n \right)$$

where $$P_{l,t}^n$$

represents the line power flow of the line l during the t period in the scene n, and $$R_{l,t}^{ol}$$

represents a line overload risk index of the line l during the t period;

$$B_{l,t}^n \left( P_{l,t}^n \right)$$

represents an overload flag of the line l during the t period in the scene n, which is specified as 1 in case of line overload, otherwise, as 0; $Ser^{ol}(\bullet)$ represents a line overload severity;
in which a line overload severity of the line l during the t period in the scene n is expressed by:

$$Ser^{ol} \left( P_{l,t}^n \right) = k_{ol} \frac{P_{l,t}^n - P_{l,max}}{P_{l,max}}$$

where $P_{l,max}$ represents a maximum of the line active power flow power of the line l and $k_{ol}$ represents an overline cost coefficient of the line power flow; and $$P_{l,t}^n = G_{l-u} P_{u,t} - G_{l-ld} L_{ld,t}.$$

According to a second aspect of embodiments of the present disclosure, an electronic device is provided. The electronic device includes at least one processor; and a memory communicatively connected with the at least one processor for storing instructions executable by the at least one processor. The processor is configured to execute the executable instructions to perform the method for quantifying and assessing a scheduling risk considering source load fluctuation and rescheduling.

According to a third aspect of embodiments of the present disclosure, a computer-readable storage medium is provided. The computer-readable storage medium has stored therein computer instructions that, when executed by a processor, causes the processor to perform the method for quantifying and assessing a scheduling risk considering source load fluctuation and rescheduling.

BRIEF DESCRIPTION OF THE DRAWINGS

FIG. 1 is a flowchart showing a method for quantifying and assessing a scheduling risk considering source load fluctuation and rescheduling according to an embodiments of the present disclosure.

DETAILED DESCRIPTION

The present disclosure provides a method for quantifying and assessing a scheduling risk considering source load fluctuation and rescheduling, and an apparatus for quantifying and assessing a scheduling risk considering source load fluctuation and rescheduling. The following will give a clear and complete description of the technical solution in embodiments of the present disclosure in combination with the drawings in embodiments of the present disclosure application. Obviously, the described embodiments are only part of embodiments of the present disclosure application, not all of them. Based on embodiments in the present disclosure application, all other embodiments obtained by those skilled in the art without creative work fall within the protection scope in the present disclosure application.

The present disclosure provides a method for quantifying and assessing a scheduling risk considering source load fluctuation and rescheduling, and an apparatus for quantifying and assessing a scheduling risk considering source load fluctuation and rescheduling. The present disclosure may evaluate and calculate a risk of an existing scheduling plan based on the rescheduling results and considering time-space coupling factors, so as to find the potential risks in the existing scheduling plan, and ensure the safe operation of the power system, which has high application value.

According to a first aspect of embodiments of the present disclosure, a method for quantifying and assessing a scheduling risk considering source load fluctuation and rescheduling is provided. The method includes establishing a scene set considering a new energy disturbance; establishing and solving a rescheduling optimization model considering the new energy disturbance in each scene based on a preset scheduling plan according to the scene set, so as to obtain a solving result of the rescheduling optimization model; and calculating a risk quantifying and assessing result corresponding to the preset scheduling plan according to the solving result of the rescheduling optimization model.

FIG. 1 is a flowchart showing a method for quantifying and assessing a scheduling risk considering source load fluctuation and rescheduling according to an embodiments of the present disclosure. As shown in FIG. 1, the method includes the following steps 1) to 3).

In step 1), a scene set considering a new energy disturbance is established.

In an embodiment of the present disclosure, a new energy output is first sampled according to a distribution probability of the new energy output by using a sampling process to obtain a sampling result. The sampling result is superimposed as a disturbance and a historical prediction value of the new energy output, so as to generate a scene.

Since the new energy output has added disturbance under the generated scene, it is required to perform a re-schedule on a basis of an existing scheduling plan before measuring a risk corresponding to each scenario with new energy output disturbance. By mobilizing existing resources, including the adjustment of AGC unit output and release of reserve capacity, the fluctuation of new energy output may be offset. If the impact of the fluctuation of the new energy output cannot be eliminated, it means that there are the corresponding risks in the scene. The risk of the scheduling plan is quantified through the method for assessing the risk proposed subsequently to obtain the corresponding indexes.

In step 2), a rescheduling optimization result is obtained based on a preset scheduling plan according to the scene set established in step 1). The rescheduling optimization result is obtained by solving a rescheduling optimization model considering the new energy disturbance in each scene.

In some embodiments, the rescheduling optimization model considering the new energy disturbance of in each scene is established and solved by the following steps 2-1) to 2-3).

In step 2-1), an objective function of the rescheduling optimization model considering the new energy disturbance of in each scene is established.

In an embodiment, for each scene, an optimization objective in the model is to minimize the sum of an operation cost and a regulation cost. The operation cost is an output cost of each generator, and the regulation cost is a cost of the abandoned wind or light and a cost of load shedding.

The objective function is expressed by:

$$\min\left\{\sum_{t=1}^{T}\sum_{g\in G^T}C_{g,t}\left(P_{g,t}^T\right)+\right.$$
$$\left.\sum_{t=1}^{T}\sum_{w\in G^{NE}}C_{w,t}\left(P_{w,t}^{NE,cut}\right)+\sum_{t=1}^{T}\sum_{ld\in L}C_{ld,t}\left(L_{ld,t}^{cut}\right)\right\}$$

where T represents a total number of periods, $G^T$ represents a collection of traditional plants in a power system, $G^{NE}$ represents a collection of new energy plants comprising wind power plants and photovoltaic power plants in the power system, L represents a load collection in the power system $$P_{g,t}^T$$

represents an output of a $g^{th}$ traditional plant during a t period, $$P_{w,t}^{NE,cut}$$

represents a value of abandoned wind or light of a $w^{th}$ new energy plant during the t period, $$L_{ld,t}^{cut}$$

represents a cut-off value of a $ld^{th}$ load during the t period, $$C_{g,t}\left(P_{g,t}^T\right)$$

represents a cost function of the output of the $g^{th}$ traditional plant during the t period, $$C_{w,t}\left(P_{w,t}^{NE,cut}\right)$$

represents a cost function of the abandoned wind or light of the $w^{th}$ new energy plant during the t period, and $$C_{ld,t}\left(L_{ld,t}^{cut}\right)$$

represents a cost function of load shedding of the $ld^{th}$ load during the t period;

In some embodiment, the cost functions re expressed by:

$$C_{g,t}\left(P_{g,t}^T\right)=a_{g,t}\left(P_{g,t}^T\right)^2+b_{g,t}P_{g,t}^T+c_{g,t}$$
$$C_{w,t}\left(P_{w,t}^{NE,cut}\right)=k_{nec}P_{w,t}^{NE,cut}$$
$$C_{ld,t}\left(L_{ld,t}^{cut}\right)=k_{lc}L_{ld,t}^{cut}$$

where $a_{g,t}$ represents a quadratic term coefficient of the cost function of the output of the $g^{th}$ traditional plant during the t period, $b_{g,t}$ represents a primary term coefficient of the cost function of the output of the $g^{th}$ traditional plant during the t period, $c_{g,t}$ represents a constant term coefficient of the cost function of the output of the $g^{th}$ traditional plant during the t period, $k_{nec}$ represents a cost coefficient of abandoned wind or light, and $k_{lc}$ is a cost coefficient of load shedding.

In step 2-2), a constraint condition of the rescheduling optimization model is determined.

In an embodiment, the rescheduling belongs to a real-time scheduling, thus a basic network security constraint, a plant output constraints and a system constraint need to be met.

In step 2-2-1), a power balance constraint is expressed by:

$$\sum_{g\in G^T}P_{g,t}^T+\sum_{w\in G^{NE}}P_{w,t}^{NE,real}-\sum_{w\in G^{NE}}P_{w,t}^{NE,cut}=$$
$$\sum_{ld\in L}L_{ld,t}-\sum_{ld\in L}L_{ld,t}^{cut}$$

where $$P_{w,t}^{NE,real}$$

represents an actual output of the $w^{th}$ new energy plant in the current scene during the t period, $$P_{w,t}^{NE,cut}$$

represents an amount of wind and light abandoned by the $w^{th}$ new energy plant during the t period, and $L_{ld,t}$ represents an initial load value of the $ld^{th}$ load during the t period;

In step 2-2-2), a load shedding constraint is expressed by:

$$0\le L_{ld,t}^{cut}\le L_{ld,t}$$

In step 2-2-3), a network security constraint is expressed by:

$$-P_l^{max} \leq G_{l-u}P_{u,t} - G_{l-ld}\left(L_{ld,t} - L_{ld,t}^{cut}\right) \leq P_l^{max}$$

where $$P_l^{max}$$

represents a line active power flow capacity of a line l, $P_{u,t}$ represents an output of a plant u during a t period, wherein the plant u comprises a traditional plant and a new energy plant, $G_{l-u}$ represents a generation transfer distribution factor of the plant u to the line l, and $G_{l-ld}$ represents a power transmission transfer distribution factor of the $ld^{th}$ load to the line l;

In step 2-2-4), a plant output constraint is expressed by:

$$P_{g,min}^{T,AGC} \leq P_{g,t}^{T,AGC} \leq P_{g,max}^{T,AGC}$$
$$0 \leq P_{w,t}^{NE,real} - P_{w,t}^{NE,cut} \leq P_{w,t,max}^{NE,sche}$$

where $$P_{g,min}^{T,AGC}$$

represents a lower limit of the output of the $g^{th}$ AGC plant in the traditional plant, $$P_{g,max}^{T,AGC}$$

represents an upper limit of the output of the $g^{th}$ AGC plant in the traditional plant, wherein non-AGC plants in the traditional plant output a power according to the preset scheduling plan, and $$P_{w,t,max}^{NE,sche}$$

represents an upper limit of a new energy output of the $w^{th}$ new energy plant during the t period in the preset scheduling plan;

In step 2-2-5), a ramp constraint of the AGC plant is expressed by:

$$RD_g^{T,AGC} \leq P_{g,t}^{T,AGC} - P_{g,t-1}^{T,AGC} \leq RU_g^{T,AGC}$$

where $$RD_g^{T,AGC}$$

represents a down ramping maximum of the $g^{th}$ AGC plant, and $$RU_g^{T,AGC}$$

represents an up ramping maximum of the $g^{th}$ AGC plant.

In step 2-3), the rescheduling optimization model considering the new energy disturbance in each scene is solved.

In an embodiment, according to the objective function in step 1-1) and the constraint conditions in step 1-2), the rescheduling optimization model is solved through YALMIP and GUROBI software packages to obtain the rescheduling optimization result. The solving result of the rescheduling model includes optimal solutions of a line power flow $P_{l,t}$, an amount of wind and light abandoned $$P_{w,t}^{NE,cut},$$

a load shedding amount $$L_{ld,t}^{cut}$$

and a traditional plant output $$P_{g,t}^T$$

in the current scene.

In the rescheduling model, decision variables are the output of each AGC unit in the traditional unit, the amount of wind and light abandoned by each wind power photovoltaic and other new energy units, the amount of load shedding, and the operation cost of the AGC unit. Since the embodiment only needs to consider an active power scheduling problem, a direct current power flow model may be used to simplify a power flow calculation process.

Each line power flow is related to the load and the generator output of all nodes in the system. The power transmission distribution factor (PTDF) of the whole system network may be calculated, and a linear relationship between each line active power flow in the system and the load and generator output of each node may be simply established, so as to perform the iterative solution.

By establishing and solving the rescheduling model corresponding to each scene, the rescheduling optimization results considering the new energy disturbance under each scene may be obtained.

In step 3), a risk quantifying and assessing result corresponding to the preset scheduling plan is calculated according to the solving result of the rescheduling optimization model obtained in the step 2).

The present disclosure adapts a simulation process to quantitatively evaluate the risks caused by the uncertainty of the new energy output. The risks brought by the randomness of the wind power and photovoltaic power output to the power grid are mainly reflected in the safety constraints such as the overload of the line power flow, the overline of the node voltage, and the insufficient power supply caused by the power imbalance. At the same time, the present disclosure considers the potential safety risks that may cause economic losses, such as the insufficient positive and negative reserve. The present disclosure only considers the possible risk of the active power scheduling, so the reactive power in the power flow is ignored temporarily, and the risk index of the overline of the voltage is not considered temporarily. Therefore, the following representative risk indicators are selected, such as a risk index of wind and light abandonment, a risk index of load shedding, a risk index of backup shortage, a ramping risk index, and an overline risk of a line power flow.

In step 3-1), a risk index of wind and light abandonment is calculated.

In the power grid, if the fluctuation of the wind turbine output exceeds the absorption capacity of the whole system, the new energy cannot be put into full power output, otherwise there will be the overline risk of the line power flow and the ramping risk, which will cause security risks and economic losses to the power grid, so that it is inevitable to selectively abandon wind and light to ensure the stable operation of the system.

In some embodiments, the risk index of wind and light abandonment is calculated by:

$$R_{necut,t} = \sum_{n=1}^{M} \frac{1}{M} Ser^{necut} \left( \sum_{w \in G^{NE}} (P_{w,t}^{necut,n}) \right)$$

where M represents a total number of scenes in the scene set in the step 1), $$P_{w,t}^{necut,n}$$

represents an amount of wind and light abandoned by the wth new energy plant during the t period in a scene n (i.e., $$P_{w,t}^{necut,n}$$

solved under each scene in step 2)); $R_{necut,t}$ represents a risk index of wind and light abandonment during the t period, and $Ser^{necut}(\bullet)$ represents a severity of wind and light abandonment.

A severity of wind and light abandonment of the wth new energy plant during the t period in the scene n is expressed by:

$$Ser^{necut} \left( \sum_{w \in G^{NE}} (P_{w,t}^{necut,n}) \right) = k_{nec} \sum_{w \in G^{NE}} (P_{w,t}^{necut,n})$$

where $k_{nec}$ represents a cost coefficient of wind and light abandonment.

In an embodiment, $k_{nec}$ is \$400/MW.

In step 3-2), a risk index of load shedding is calculated.

In the power grid, in some extremely small probability scenes, if there is a component failure or a huge deviation in the output of new energy, under the original scheduling plan, even if all adjustable resources are mobilized, the power balance between power generation and load side cannot be achieved in a short time. In order to maintain the transient stability of the system, the load shedding is generally selected to restore the balance between supply and demand, which leads to the loss of power supply for some users.

The risk index of load shedding is determined a load shedding probability and a load shedding risk measurement by:

$$R_{cut,t} = \sum_{n=1}^{M} \frac{1}{M} Ser^{cut}(L_{cut,t}^{n})$$

where $$L_{cut,t}^{n}$$

represents a load shedding amount (i.e., $$L_{cut,t}^{n}$$

solved under each scene in step 2)) during the t period in the scene n, $R_{cut,t}$ represents a risk index of load shedding during the t period, and $Ser^{cut}(\bullet)$ represents a severity of load shedding.

A severity of load shedding during the t period in the scene n is expressed by:

$$Ser^{cut}\left(L_{cut,t}^{n}\right) = k_{lc} L_{cut,t}^{n}$$

where $k_{lc}$ represents a cost coefficient of load shedding.

In an embodiment, $k_{lc}$ is \$20000/MW.

In step 3-30, a risk index of backup shortage is calculated.

In the power grid, in order to ensure the safe and stable operation of the system, it is required to reserve sufficient positive and negative backups, which may resist the fluctuation of the new energy output, ensures the power balance between power generation and load, and enable the system operate safe and stable. If the system does not reserve sufficient backup, the ability for resisting uncertainty factors will be greatly reduced, resulting in a significant reduction in system security. Thus, the risk measurement of the backup shortage is important for the new power systems with large-scale addition of new energy such as wind power and photovoltaic.

The risk assessment algorithm in embodiments includes two dimensions of time and space. Therefore, when considering the risk of the backup shortage, the ramping ability of each generator needs to be added. That is, an upper limit of the output of the generator in a certain period is not the capacity of the generator unit, but related to the output of the generator in the previous time node and the ramping ability of the generator unit.

A maximum value of the output of the gth traditional plant during the t period is:

$$P_{g,t}^{T,max} = \min\left(P_{g}^{T,max}, P_{g,t-1}^{T} + RU_g \cdot t_0\right);$$

a minimum value of the output of the gth traditional plant during the t period is:

$$P_{g,t}^{T,min} = \max\left(P_{g}^{T,min}, P_{g,t-1}^{T} - RD_g \cdot t_0\right)$$

where $$P_{g,t}^{T,max}$$

represents the maximum value of the output of the $g^{th}$ traditional plant during the t period, $$P_{g,t}^{T,min}$$

represents the minimum value of the output of the $g^{th}$ traditional plant during the t period, $$P_g^{T,max}$$

represents a maximum value of an output requirement of the $g^{th}$ traditional plant, $$P_g^{T,min}$$

represents a minimum value of the output requirement of the $g^{th}$ traditional plant, $RU_g$ represents an up ramping capacity of the $g^{th}$ traditional plant, $RD_g$ represents a down ramping capacity of the $g^{th}$ traditional plant, and $t_0$ represents a time interval between two adjacent time points.

A total amount (i.e., a sum) of positive backups and negative backups in the power system during the t period according to $$P_{g,t}^{T,max} \text{ and } P_{g,t}^{T,min}$$

in each plant is calculated by:

$$RE_t^{pos} = \sum_{g=1}^{N_g} \left( P_{g,max}^{T,AGC} - P_{g,t}^{T,AGC} \right)$$

$$RE_t^{neg} = \sum_{g=1}^{N_g} \left( P_{g,t}^{T,AGC} - P_{g,min}^{T,AGC} \right)$$

where $$RE_t^{pos}$$

represents a total amount of positive backups in the power system during the t period, $$RE_t^{neg}$$

represents a total amount of negative backups in the power system during the t period, and $N_g$ represents a total number of AGC plants in the power system.

An interpolation between the total amount of positive backups and negative backups of the system and a threshold value of positive backups and negative backups is an amount of positive backups and negative backups, so the risk index of positive backups and negative backups may be defined as:

$$R_{RE,t}^{pos} = \sum_{n=1}^{M} \frac{1}{M} B_{rep,t}^n (RE_t^{pos,n}) Ser^{rep}(RE_t^{pos,n})$$

$$R_{RE,t}^{neg} = \sum_{n=1}^{M} \frac{1}{M} B_{ren,t}^n (RE_t^{neg,n}) Ser^{ren}(RE_t^{neg,n})$$

where $$B_{rep,t}^n (RE_t^{pos,n})$$

represents a first flag of positive backup shortage during the t period in the scene n, $$B_{ren,t}^n (RE_t^{neg,n})$$

represents a second flag of negative backup shortage during the t period in the scene n, each of the first flag and the second flag being specified as 1 in case of backup shortage, otherwise, as 0;

$$R_{RE,t}^{pos}$$

represents a risk index of positive backup shortage during the t period, $$R_{RE,t}^{neg}$$

represents a risk index of negative backup shortage during the t period.

$Ser^{rep}(\bullet)$ represents a severity of positive backup shortage, and $Ser^{ren}(\bullet)$ represents a severity of negative backup shortage.

A severity of positive backup shortage during the t period in the scene n is represented by:

$$Ser^{rep}(RE_t^{pos,n}) = k_{rep}(rep_0 - RE_t^{pos,n});$$

a severity of negative backup shortage during the t period in the scene n is represented by:

$$Ser^{ren}(RE_t^{neg,n}) = k_{ren}(ren_0 - RE_t^{neg,n})$$

where $rep_0$ represents a threshold value (it generally is a capacity of the largest plant in a system) of positive backup sufficiency of the power system, $ren_0$ represents a threshold value (it generally is a capacity of the largest plant in a system) of negative backup sufficiency of the power system, $k_{rep}$ represents a cost coefficient of positive backups, and $k_{ren}$ represents a cost coefficient of negative backups.

In an embodiment, the cost coefficient is 1.

In step 3-4), a ramping risk index is calculated.

In the power grid considering the new energy output on a large scale, the fluctuation of the system load in the adjacent period is superimposed with the fluctuation of the new energy output, which amplifies the overall fluctuation of the source load of the whole system, and bring a huge challenge to the AGC aggregate in real-time dispatching. It is required that the AGC aggregate has sufficient ramping ability to deal with the fluctuation of the source load on both sides. If the ramping ability of the whole system is insufficient, which will causes a ramping risk. Therefore, it is required to quantify the ramping risk of system.

The measurement of ramping risk in the system is generally to measure whether the existing ramping ability of the system may offset the fluctuation of both sides of the source and load. Therefore, the ramping risk should be defined as a difference between the ramping ability and the fluctuation of wind power and load in the system. The ramping risk index may be determined by:

$$R_{ramp}^{up} = \sum_{n=1}^{M} \frac{1}{M} B_{Rup,t}^{n} Ser^{rampup}$$

$$R_{ramp}^{dn} = \sum_{n=1}^{M} \frac{1}{M} B_{Rdn,t}^{n} Ser^{rampdn}$$

where $$B_{Rup,t}^{n}$$

represents a first marking variable of an up ramping risk during the t period in the scene n, and $$B_{Rdn,t}^{n}$$

represents a second marking variable of a down ramping risk during the t period in the scene n, each of the first marking variable and the second marking variable being specified as 1 in case that a ramping risk occurs, otherwise, as 0;

$$R_{ramp}^{up}$$

represents a risk index of the up ramping risk during the t period, and $$R_{ramp}^{dn}$$

represents a risk index of the down ramping risk during the t period; $Ser^{rampup}$ represents a severity of up ramping, and $Ser^{rampdn}$ represents a severity of down ramping.

A severity of up ramping during the t period in the scene n is expressed by:

$$Ser^{rampup} = k_{RU}(-WL_t^n - RU);$$

a severity of down ramping during the t period in the scene n is expressed by:

$$Ser^{rampdn} = k_{RD}(WL_t^n - RD))$$

where RU represents a maximum capability of up ramping of the power system, RD represents a maximum capability of down ramping of the power system, $k_{RU}$ represents a cost coefficient of up ramping, and $k_{RU}$ represents a cost coefficient of down ramping;

$$WL_t^n$$

represents a scene imbalance amount during the t period in the scene n, that is, a sum of new energy output and load fluctuation during the t period in the scene n.

In an embodiment, the cost coefficient is 1.

At the same time, since the method for assessing the risk in embodiments is based on the existing scheduling plan, the default planned units output according to the original scheduling plan in different scenes, which is not within a controllable range, so it is included in a fluctuation range. A scene imbalance amount during the t period in the scene n, and is expressed by:

$$WL_t^n = \sum_{w \in G^{NE}} \left(P_{w,t}^{NE,real} - P_{w,t-1}^{NE,real}\right) + \sum_{g \in G^T} \left(P_{g,t}^T - P_{g,t-1}^T\right) - \sum_{ld \in L} \left(L_{ld,t} - L_{ld,t-1}\right)$$

In step 3-5), an overline risk of a line power flow is calculated.

In the new power system, failure in components and the fluctuation of the output of new energy are likely to cause the redistribution of the entire network power flow, which deviates from the original dispatching plan. At this time, it is very likely that the line power flow will be overloaded, which will further lead to the damage of the overloaded line. In serious cases, the whole system is at risk of collapse, causing huge economic losses.

The risk of line overload may reflect a probability and a degree of line overload, and the overload risk is determined by:

$$R_{l,t}^{ol} = \sum_{n=1}^{M} \frac{1}{M} B_{l,t}^{n}(P_{l,t}^{n}) Ser^{ol}(P_{l,t}^{n})$$

where $$P_{l,t}^{n}$$

represents the line power flow (i.e., $$P_{l,t}^{n}$$

solved under each scene in step 2)) of the line l during the t period in the scene n, and $$R_{l,t}^{ol}$$

represents a line overload risk index of the line l during the t period;

$$B_{l,t}^{n}(P_{l,t}^{n})$$

represents an overload flag of the line l during the t period in the scene n, which is specified as 1 in case of line overload, otherwise, as 0; $Ser^{ol}(\bullet)$ represents a line overload severity.

A line overload severity of the line l during the t period in the scene n is expressed by:

$$Ser^{ol}(P_{l,t}^{n}) = k_{ol}\frac{P_{l,t}^{n} - P_{l,max}}{P_{l,max}}$$

where $P_{l,max}$ represents a maximum of the line active power flow power of the line l, and $k_{ol}$ represents an overline cost coefficient of the line power flow; and a subscript ol represents overline. In an embodiment, the overline cost coefficient is 1.

It is noted that after the rescheduling model is solved, the risk index of load shedding and the risk index of wind and light abandonment may be obtained simply through a statistical process. $R_{cut,t}$ represents a risk index of load shedding during the t period, and $R_{windcut,t}$ represents a risk index of wind and light abandonment during the t period. The risk index of backup shortage may be obtained by setting a determined system rotation backup threshold and counting the calculation results of each scene.

$$R_{RE,t}^{pos}$$

represents a risk index of positive backup shortage during the t period, and $$R_{RE,t}^{neg}$$

represents a risk index of negative backup shortage during the t period. The ramping risk index may be obtained simply by comparing the wind power output difference, load fluctuation difference and the output change of the unit planned in the adjacent periods under each scene.

$$R_{ramp}^{up}$$

represents a risk index of the up ramping risk during the t period, and $$R_{ramp}^{dn}$$

represents a risk index of the down ramping risk during the t period.

However, it is hard to obtain the an overline risk of the line power flow directly. The reason is that the line power flow constraint is added in the calculation of the rescheduling model, and the calculated results meet the limit of the line power flow. In the iterative calculation, the overline of the line power flow will be avoided by increasing the amount of load shedding, the amount of wind and light abandonment, or the adjustment of AGC units. Therefore, the calculation process of the overline risk of the line power flow needs to be reconsidered. In fact, there is a causal relationship between the above-mentioned five risk indexes. That is, the overline risk of the line power flow, the risk index of the backup shortage and the extreme ramping risk are the main reasons for load shedding, wind abandonment and light abandonment. That is, the first three risks are the reasons and the last two risks are the results. The causal relationship causes that a amount of the overline of the line power flow scheduled cannot be obtained. Therefore, it is needed to remove the influence of "results" on the basis of the results of the rescheduling. That is, in the original scene, the load shedding and wind and light abandonment are not considered, only the output of the AGC unit is adjusted to calculate the power flow in the system again, so as to obtain a value in each line power flow value. By comparing with the corresponding line active power flow capacity, the value corresponding to the overline risk of the line power flow may be obtained by:

$$R_{l,t}^{ol} = \sum_{n=1}^{M}\frac{1}{M}B_{l,t}^{n}(P_{l,t}^{n})Ser^{ol}(P_{l,t}^{n})$$

where $$P_{l,t}^{n} = G_{l-u}P_{u,t} - H_{l-ld}L_{ld,t}.$$

In an embodiment, based on different scheduling plans, steps 1) to 3) are repeated to obtain the results for quantifying and assessing risk under various indexes corresponding to different scheduling plans.

In some embodiments, the calculated values of each risk index may clearly understand the risk situation at each time. For example, how many spare parts are needed for ramping and overline, or how much wind and light need to be abandoned or load cut. Each index under each scheduling plan may be analyzed separately to prepare for subsequent risk elimination measures. Finally, the risk value of the overline of the line power flow, backup shortage and extreme ranping is quantified as power. According to the value quantized, reference may be provided for the subsequent need to eliminate the risk by other means. In addition, the risk value (USD) of load shedding, wind and light abandonment may be used as a reference for the economic loss cost, if not eliminated.

In order to realize the above-mentioned embodiments, a second aspect of embodiments of the present disclosure provides an apparatus for quantifying and assessing a scheduling risk considering source load fluctuation and rescheduling.

The apparatus includes a scene set constructing module configured to establish a scene set considering new energy disturbance; a rescheduling module configured to establish and solve a rescheduling optimization model considering the new energy disturbance in each scene based on a preset scheduling plan according to the scene set, so as to obtain a solving result of the rescheduling optimization model; and a risk assessing module configured to calculate a risk quantifying and assessing result corresponding to the preset scheduling plan according to the solving result of the rescheduling optimization model.

It is noted that the explanation of the embodiments of the method for quantifying and assessing the scheduling risk considering source load fluctuation and rescheduling is applicable to the apparatus for quantifying and assessing the scheduling risk considering source load fluctuation and rescheduling, which will not be repeated here. According to embodiments of the present disclosure, the apparatus for quantifying and assessing the scheduling risk considering source load fluctuation and rescheduling is proved. The scene set considering new energy disturbance is established. The rescheduling optimization model considering the new energy disturbance in each scene is established and solved based on a preset scheduling plan according to the scene set, so as to obtain a solving result of the rescheduling optimization model. The risk quantifying and assessing result corresponding to the preset scheduling plan is calculated according to the solving result of the rescheduling optimization model. In this way, based on the rescheduling results, considering the time-space coupling factors, the risk assessment and calculation of the existing dispatching plan may be realized to find the potential risks in the existing dispatching plan and ensure the safe operation of the power system, which has high application value.

The method and the apparatus in the present disclosure is reliable, fast and easy to use.

The present disclosure adapts a simulation process to conduct a large number of random sampling of random variables in a sampling space, so as to obtain a large number of samples that meets the probability distribution, and are used to reflect all possible scenarios in the operation, which facilitates to evaluate and analyze risk through a large number of samples.

The present disclosure may perform spatiotemporal coupling risk assessment on the scheduling plan given by the current scheduling to find out the potential risks in the existing scheduling plan, and provide the time point or the location of the risk, which is conducive to optimization and improvement of the existing scheduling plan.

The present disclosure provides a rescheduling process under a single scenario, which is a re-schedule, in the generated scenario, based on the existing scheduling plan before measuring the risk corresponding to each scenario due to the disturbance added by new energy output.

The present disclosure may obtain the risk index of load shedding, the risk index of wind and light abandonment, the risk index of backup shortage, and the ramping risk by solving the model and calculating with statistical processes. A value of the flow overline risk of the line power may be obtained through the power flow calculation of the system. Therefore, the value of each risk index may be obtained for accurate risk assessment, which has a high application value.

In order to realize the above-mentioned embodiments, a third aspect of embodiments of the present disclosure provides an electronic device. The electronic device includes at least one processor; and a memory communicatively connected with the at least one processor for storing instructions executable by the at least one processor. The processor is configured to execute the executable instructions to perform the method for quantifying and assessing a scheduling risk considering source load fluctuation and rescheduling.

In order to realize the above-mentioned embodiments, a fourth aspect of embodiments of the present disclosure provides a computer-readable storage medium. The computer-readable storage medium has stored therein computer instructions that, when executed by a processor, causes the processor to perform the method for quantifying and assessing a scheduling risk considering source load fluctuation and rescheduling.

It is noted that the computer-readable medium described in the present disclosure may be a computer-readable signal medium, a computer-readable storage medium or any combination thereof. The computer-readable storage medium may be, for example, but not limited to, electrical, magnetic, optical, electromagnetic, infrared, or semiconductor systems, apparatuses, devices, or any combination thereof. More specific examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program, which may be used by or in combination with an instruction execution system, apparatus or device. In the present disclosure, the computer-readable signal medium may include the data signal transmitted in the baseband or as part of the carrier, which carries the computer-readable program code. Such transmitted data signals may take various forms, including but not limited to electromagnetic signals, optical signals or any suitable combination thereof. The computer-readable signal medium may be any computer-readable medium other than the computer-readable storage medium. The computer-readable signal medium may send, transmit or communicate programs for use by or in combination with the instruction execution system, apparatus or device. The program code contained on the computer readable media may be transmitted using any suitable medium, including but not limited to, a wire, an optical cable, a radio frequency (RF) or any suitable combination thereof.

The computer-readable medium may be included in the electronic device; or the computer-readable medium may exist alone without being assembled into the electronic device. The above-mentioned computer-readable medium carries one or more programs. When the above-mentioned one or more programs are executed by the electronic device, the electronic device is made to perform the method for quantifying and assessing the scheduling risk considering source load fluctuation and rescheduling in the above-mentioned embodiment.

Computer program code for performing the operations of the present disclosure may be written in one or more programming languages or combinations thereof. The above-mentioned programming languages include object-oriented programming languages, such as Java, Smalltalk, C++; conventional procedural programming languages, such as "C" language or similar programming languages. The program code may be completely executed on the user computer, partially executed on the user computer, executed as an independent software package, partially executed on the user computer, partially executed on the remote computer, or completely executed on the remote computer or server. In case of involving a remote computer, the remote computer may connect to the user computer through any kind of network, including a local area network (LAN) or a wide area network (WAN), or may connect to an external computer (for example, using an Internet service provider to connect through the Internet).

In case of involving a remote computer, the remote computer may connect to the user computer through any kind of network, including a local area network (LAN) or a wide area network (WAN), or it can connect to an external computer (for example, using an Internet service provider to connect through the Internet).

In the description of the specification, the terms "one embodiment", "some embodiments", "examples", "specific examples", or "some examples" means that a particular feature, structure, material, or characteristic described in connection with the embodiment or example is included in at least one embodiment or example of the present disclosure. In the specification, the schematic expression of the above-mentioned terms are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine different embodiments or examples described in the specification and the features of different embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

The flow chart or any process or method described herein in other manners may represent a module, segment, or portion of code that includes one or more executable instructions to implement the specified logic function(s) or that includes one or more executable instructions of the steps of the progress. The scope of the embodiments of the present disclosure includes other implementations, in which the functions may be performed in a substantially simultaneous manner or in a reverse order according to the functions involved, rather than in the order shown or discussed, which is understood by those skilled in the technical field to which the embodiments of the present application belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although illustrative embodiments have been shown and described, it would be appreciated by those skilled in the art that the above embodiments cannot be construed to limit the present disclosure, and changes, alternatives, modifications and variants may be made in the embodiments without departing from scope of the present disclosure.

What is claimed is:

1. A method for quantifying and assessing a scheduling risk considering source load fluctuation and rescheduling, comprising:

establishing a scene set considering a new energy disturbance;

establishing and solving a rescheduling optimization model considering the new energy disturbance in each scene based on a preset scheduling plan according to the scene set, so as to obtain a solving result of the rescheduling optimization model;

calculating a risk quantifying and assessing result corresponding to the preset scheduling plan according to the solving result of the rescheduling optimization model; and

adjusting the preset scheduling plan according to the risk quantifying and assessing result to control operation of a power system;

wherein the rescheduling optimization model considering the new energy disturbance consists of an objective function and a constraint condition; the objective function is used to minimize a sum of an operation cost and a regulation cost in a current scene; and the constraint condition comprises a power balance constraint, a load shedding constraint, a network security constraint, a plant output constraint and a ramp constraint of an AGC plant;

wherein the objective function is expressed by:

$$\min\left\{\sum_{t=1}^{T}\sum_{g\in G^{T}}C_{g,t}\left(P_{g,t}^{T}\right)+ \right.$$
$$\left.\sum_{t=1}^{T}\sum_{w\in G^{NE}}C_{w,t}\left(P_{w,t}^{NE,cut}\right)+\sum_{t=1}^{T}\sum_{ld\in L}C_{ld,t}\left(L_{ld,t}^{cut}\right)\right\}$$

where T represents a total number of periods, $G^{T}$ represents a collection of traditional plants in a power system, $G^{NE}$ represents a collection of new energy plants comprising wind power plants and photovoltaic power plants in the power system, L represents a load collection in the power system, $$P_{g,t}^{T}$$

represents an output of a $g^{th}$ traditional plant during a t period, $$P_{w,t}^{NE,cut}$$

represents a value or abandoned wind or light of a $w^{th}$ new energy plant during the t period, $$L_{ld,t}^{cut}$$

represents a cut-on value or a $ld^{th}$ load during the t period, $$C_{g,t}\left(P_{g,t}^{T}\right)$$

represents a test function of the output of the $g^{th}$ traditional plant during the t period, $$C_{w,t}\left(P_{w,t}^{NE,cut}\right)$$

represents a cost function of the abandoned wind or light of the $w^{th}$ new energy plant during the t period, and $$C_{ld,t}\left(L_{ld,t}^{cut}\right)$$

28 represents a cost function of load shedding of the $ld^{th}$ load during the t period;

wherein $$C_{g,t}\left(P_{g,t}^{T}\right)=a_{g,t}\left(P_{g,t}^{T}\right)^{2}+b_{g,t}P_{g,t}^{T}+c_{g,t}$$
$$C_{w,t}\left(P_{w,t}^{NE,cut}\right)=k_{nec}P_{w,t}^{NE,cut}$$
$$C_{ld,t}\left(L_{ld,t}^{cut}\right)=k_{lc}L_{ld,t}^{cut}$$

where $a_{g,t}$ represents a quadratic term coefficient of the cost function of the output of the $g^{th}$ traditional plant during the t period, $b_{g,t}$ represents a primary term coefficient of the cost function of the output of the $g^{th}$ traditional plant during the t period, $c_{g,t}$ represents a constant term coefficient of the cost function of the output of the $g^{th}$ traditional plant during the t period, $k_{nec}$ represents a cost coefficient of abandoned wind or light, and $k_{lc}$ is a cost coefficient of load shedding.

2. The method according to claim 1, wherein establishing the scene set considering the new energy disturbance comprises:

sampling a new energy output according to a distribution probability of the new energy output to obtain a sampling result;

obtaining at least one scene by superimposing the sampling result as a disturbance and a historical prediction value of the new energy output; and determining the at least one scene as the scene set considering the new energy disturbance.

3. The method according to claim 1, wherein the power balance constraint is expressed by:

$$\sum_{g\in G^{T}}P_{g,t}^{T}+\sum_{w\in G^{NE}}P_{w,t}^{NE,real}-\sum_{w\in G^{NE}}P_{w,t}^{NE,cut}=$$
$$\sum_{ld\in L}L_{ld,t}-\sum_{ld\in L}L_{ld,t}^{cut}$$

where $$P_{w,t}^{NE,real}$$

represents an actual output of the $w^{th}$ new energy plant in the current scene during the t period, $$P_{w,t}^{NE,cut}$$

represents an amount of wind and light abandoned by the $w^{th}$ new energy plant during the t period, and $L_{ld,t}$ represents an initial load value of the $ld^{th}$ load during the t period.

4. The method according to claim 1, wherein the load shedding constraint is expressed by:

$$0\le L_{ld,t}^{cut}\le L_{ld,t}.$$

5. The method according to claim 1, wherein the network security constraint is expressed by:

$$-P_l^{max} \le G_{l-u}P_{u,t} - G_{l-ld}\left(L_{ld,t} - L_{ld,t}^{cut}\right) \le P_l^{max}$$

where $$P_l^{max}$$

represents a line active power now capacity of a line l, $P_{u,t}$ represents an output of a plant u during a t period, wherein the plant u comprises a traditional plant and a new energy plant, $G_{l-u}$ represents a generation transfer distribution factor of the plant u to the line l, and $G_{l-ld}$ represents a power transmission transfer distribution factor of the $ld^{th}$ load to the line l.

6. The method according to claim 1, wherein the plant output constraint is expressed by:

$$P_{g,min}^{T,AGC} \le P_{g,t}^{T,AGC} \le P_{g,max}^{T,AGC}$$

$$0 \le P_{w,t}^{NE,real} - P_{w,t}^{NE,cut} \le P_{w,t,max}^{NE,sche}$$

where $$P_{g,min}^{T,AGC}$$

represents a lower limit of the output of the $g^{th}$ AGC plant in the traditional plant, $$P_{g,max}^{T,AGC}$$

represents all upper limit of the output of the $g^{th}$ AGC plant in the traditional plant, wherein non-AGC plants in the traditional plant output a power according to the preset scheduling plan, and $$P_{w,t,max}^{NE,sche}$$

represents an upper limit of a new energy output of the $w^{th}$ new energy plant during the t period in the preset scheduling plan.

7. The method according to claim 1, wherein the ramp constraint of the AGC plant is expressed by:

$$RD_g^{T,AGC} \le P_{g,t}^{T,AGC} - P_{g,t-1}^{T,AGC} \le RU_g^{T,AGC}$$

where $$RD_g^{T,AGC}$$

represents a down ramping maximum of the $g^{th}$ AGC plant, and $$RU_g^{T,AGC}$$

represents an up ramping maximum of the $g^{th}$ AGC plant.

8. The method according to claim 3, wherein the solving result of the rescheduling model comprises optimal solutions of $P_{l,t}$, $$P_{w,t}^{NE,cut}, L_{ld,t}^{cut} \text{ and } P_{g,t}^T$$

in the current scene, where $P_{l,t}$ represents a line power flow of the line l during the t period.

9. The method according to claim 8, wherein calculating the risk quantifying and assessing result corresponding to the scheduling plan according to the solving result of the rescheduling optimization model comprises:

1) calculating a risk index of wind and light abandonment by:

$$R_{necut,t} = \sum_{n=1}^M \frac{1}{M} Ser^{necut}\left(\sum_{w \in G^{NE}} (P_{w,t}^{necut,n})\right)$$

where M represents a total number of scenes in the scene set, $$P_{w,t}^{necut,n}$$

represents an amount of wind and light abandoned by the $w^{th}$ new energy plant during the t period in a scene n; $R_{necut,t}$ represents a risk index of wind and light abandonment during the t period, and $Ser^{necut}(\bullet)$ represents a severity of wind and light abandonment;

wherein a severity of wind and light abandonment of the $w^{th}$ new energy plant during the t period in the scene n is expressed by:

$$Ser^{necut}\left(\sum_{w \in G^{NE}} (P_{w,t}^{necut,n})\right) = k_{nec}\sum_{w \in G^{NE}} (P_{w,t}^{necut,n})$$

2) calculating a risk index of load shedding by:

$$R_{cut,t} = \sum_{n=1}^M \frac{1}{M} Ser^{cut}(L_{cut,t}^n)$$

where $$L_{cut,t}^n$$

represents a load shedding amount during the t period in the scene n, $R_{cut,t}$ represents a risk index of load shedding during the t period, and $Ser^{cut}(\bullet)$ represents a severity of load shedding;

wherein a severity of load shedding during the t period in the scene n is expressed by:

$$Ser^{cut}(L_{cut,t}^n) = k_{lc}L_{cut,t}^n$$

3) calculating a risk index of backup shortage by; assuming that a maximum value of the output of the $g^{th}$ traditional plant during the t period is:

$$P_{g,t}^{T,max} = \min(P_g^{T,max}, P_{g,t-1}^T + RU_g \cdot t_0)$$

a minimum value of the output of the $g^{th}$ traditional plant during the t period is:

$$P_{g,t}^{T,min} = \max(P_g^{T,min}, P_{g,t-1}^T - RD_g \cdot t_0)$$

where $$P_{g,t}^{T,max}$$

represents the maximum value of the output of the $g^{th}$ traditional plant during the t period, $$P_{g,t}^{T,min}$$

represents the minimum value of the output of the $g^{th}$ traditional plant during the t period, $$P_g^{T,max}$$

represents a maximum value of an output requirement of the $g^{th}$ traditional plant, $$P_g^{T,min}$$

represents a minimum value of the output requirement of the $g^{th}$ traditional plant, $RU_g$ represents an up ramping capacity of the $g^{th}$ traditional plant, $RD_g$ represents a down ramping capacity of the $g^{th}$ traditional plant, and $t_0$ represents a time interval between two adjacent time points;

calculating a total amount of positive backups and negative backups in the power system during the t period according to $$P_{g,t}^{T,max} \text{ and } P_{g,t}^{T,min}$$

in each plant by:

$$RE_t^{pos} = \sum_{g=1}^{N_g} \left(P_{g,max}^{T,AGC} - P_{g,t}^{T,AGC}\right)$$

$$RE_t^{neg} = \sum_{g=1}^{N_g} \left(P_{g,t}^{T,AGC} - P_{g,min}^{T,AGC}\right)$$

where $$RE_t^{pos}$$

represents a total amount or positive backups in the power system during the t period, $$RE_t^{neg}$$

represents a total amount of negative backups in the power system during the t period, and $N_g$ represents a total number of AGC plants in the power system; then $$R_{RE,t}^{pos} = \sum_{n=1}^{M} \frac{1}{M} B_{rep,t}^n(RE_t^{pos,n}) Ser^{rep}(RE_t^{pos,n})$$

$$R_{RE,t}^{neg} = \sum_{n=1}^{M} \frac{1}{M} B_{ren,t}^n(RE_t^{neg,n}) Ser^{ren}(RE_t^{neg,n})$$

where $$B_{rep,t}^n(RE_t^{pos,n})$$

represents a first nag of positive backup shortage during the t period in the scene n, $$B_{ren,t}^n(RE_t^{neg,n})$$

represents a second flag of negative backup shortage during the t period in the scene n, each of the first flag and the second flag being specified as 1 in case of backup shortage, otherwise, as 0;

$$R_{RE,t}^{pos}$$

represents a risk index of positive backup shortage during the t period, $$R_{RE,t}^{neg}$$

represents a risk index of negative backup shortage during the t period, $Ser^{rep}(\bullet)$ represents a severity of positive backup shortage, and $Ser^{ren}(\bullet)$ represents a severity of negative backup shortage;

wherein a severity of positive backup shortage during the t period in the scene n is represented by:

$$Ser^{rep}(RE_t^{pos}) = k_{rep}(rep_0 - RE_t^{pos,n})$$

wherein a severity of negative backup shortage during the t period in the scene n is represented by:

33

$$Ser^{ren}(RE_t^{neg,n}) = k_{ren}(ren_0 - RE_t^{neg,n})$$

where $rep_0$ represents a threshold value of positive backup sufficiency of the power system, $ren_0$ represents a threshold value of negative backup sufficiency of the power system, $k_{rep}$ represents a cost coefficient of positive backups, and $k_{ren}$ represents a cost coefficient of negative backups;

4) calculating a ramping risk index by:

$$R_{ramp}^{up} = \sum_{n=1}^{M} \frac{1}{M} B_{Rup,t}^{n} Ser^{rampup}$$

$$R_{ramp}^{dn} = \sum_{n=1}^{M} \frac{1}{M} B_{Rdn,t}^{n} Ser^{rampdn}$$

where $$B_{Rup,t}^{n}$$

represents a first marking variable of an up ramping risk during the t period in the scene n, and $$B_{Rdn,t}^{n}$$

represents a second marking variable of a down ramping risk during the t period in the scene n, each of the first marking variable and the second marking variable being specified as 1 in case that a ramping risk occurs, otherwise, as 0;

$$R_{ramp}^{up}$$

represents a risk index of the up ramping risk during the t period, and $$R_{ramp}^{dn}$$

represents a risk index of the down ramping risk during the t period; $Ser^{rampup}$ represents a severity of up ramping, and $Ser^{rampdn}$ represents a severity of down ramping;

wherein a severity of up ramping during the t period in the scene n is expressed by:

$$Ser^{rampup} = k_{RU}(-WL_t^n - RU)$$

a severity of down ramping during the t period in the scene n is expressed by:

$$Ser^{rampdn} = k_{RD}(WL_t^n - RD))$$

34 where RU represents a maximum capability of up ramping of the power system, RD represents a maximum capability of down ramping of the power system, $k_{RU}$ represents a cost coefficient of up ramping, and $k_{RU}$ represents a cost coefficient of down ramping;

$$WL_t^n$$

represents a scene imbalance amount during the t period in the scene n, and is expressed by:

$$WL_t^n = \sum_{w \in G^{NE}} \left( P_{w,t}^{NE,real} - P_{w,t-1}^{NE} \right) + \sum_{g \in G^T} \left( P_{g,t}^{T} - P_{g,t-1}^{T} \right) - \sum_{ld \in L} (L_{ld,t} - L_{ld,t-1})$$

5) calculating an overline risk of a line power flow by:

$$R_{l,t}^{ol} = \sum_{n=1}^{M} \frac{1}{M} B_{l,t}^{n}(P_{l,t}^{n}) Ser^{ol}(P_{l,t}^{n})$$

where $$P_{l,t}^{n}$$

represent the line power flow of the line l during the t period in the scene n, and $$R_{l,t}^{ol}$$

represents a line overload risk index of the line l during the t period;

$$B_{l,t}^{n}(P_{l,t}^{n})$$

represents an overload flag of the line l during the t period in the scene n, which is specified as 1 in case of line overload, otherwise, as 0; $Ser^{ol}(\bullet)$ represents a line overload severity;

wherein a line overload severity of the line l during the t period in the scene n is expressed by:

$$Ser^{ol}(P_{l,t}^{n}) = k_{ol} \frac{P_{l,t}^{n} - P_{l,max}}{P_{l,max}}$$

where $P_{l,max}$ represents a maximum of the line active power flow power of the line l, and $k_{ol}$ represents an overline cost coefficient of the line power flow; and $$P_{l,t}^{n} = G_{l-u}P_{u,t} - G_{l-ld}L_{ld,t}.$$

10. An electronic device, comprising:
at least one processor; and a memory communicatively connected with the at least one processor for storing instructions executable by the at least one processor;

wherein the at least one processor is configured to:

establish a scene set considering a new energy disturbance;

establish and solving a rescheduling optimization model considering the new energy disturbance in each scene based on a preset scheduling plan according to the scene set, so as to obtain a solving result of the rescheduling optimization model;

calculate a risk quantifying and assessing result corresponding to the preset scheduling plan according to the solving result of the rescheduling optimization model; and adjust the preset scheduling plan according to the risk quantifying and assessing result to control operation of a power system;

wherein the rescheduling optimization model considering the new energy disturbance consists of an objective function and a constraint condition; the objective function is used to minimize a sum of an operation cost and a regulation cost in a current scene; and the constraint condition comprises a power balance constraint, a load shedding constraint, a network security constraint, a plant output constraint and a ramp constraint of an AGC plant;

wherein the objective function is expressed by:

$$\min\left\{ \sum\nolimits_{t=1}^{T} \sum\nolimits_{g\in G^{T}} C_{g,t}\left(P_{g,t}^{T}\right) + \right.$$
$$\left. \sum\nolimits_{t=1}^{T} \sum\nolimits_{w\in G^{NE}} C_{w,t}\left(P_{w,t}^{NE,cut}\right) + \sum\nolimits_{t=1}^{T} \sum\nolimits_{ld\in L} C_{ld,t}\left(L_{ld,t}^{cut}\right) \right\}$$

where T represents a total number of periods, $G^{T}$ represents a collection of traditional plants in a power system, $G^{NE}$ represents a collection of new energy plants comprising wind power plants and photovoltaic power plants in the power system, L represents a load collection in the power system, $$P_{g,t}^{T}$$

represents an output of a $g^{th}$ traditional plant during a t period, $$P_{w,t}^{NE,cut}$$

represents a value of abandoned wind or light of a $w^{th}$ new energy plant during the t period, $$L_{ld,t}^{cut}$$

represents a cut-off value of a $ld^{th}$ load during the t period, $$C_{g,t}\left(P_{g,t}^{T}\right)$$

represents a cost function of the output of the $g^{th}$ traditional plant during the t period, $$C_{w,t}\left(P_{w,t}^{NE,cut}\right)$$

represents a cost function of the abandoned wind or light of the $w^{th}$ new energy plant during the t period, and $$C_{ld,t}\left(L_{ld,t}^{cut}\right)$$

represents a cost function of load shedding of the $ld^{th}$ load during the t period;

wherein $$C_{g,t}\left(P_{g,t}^{T}\right) = a_{g,t}\left(P_{g,t}^{T}\right)^{2} + b_{g,t}P_{g,t}^{T} + c_{g,t}$$
$$C_{w,t}\left(P_{w,t}^{NE,cut}\right) = k_{nec}P_{w,t}^{NE,cut}$$
$$C_{ld,t}\left(L_{ld,t}^{cut}\right) = k_{lc}L_{ld,t}^{cut}$$

where $a_{g,t}$ represents a quadratic term coefficient of the cost function of the output of the $g^{th}$ traditional plant during the t period, $b_{g,t}$ represents a primary term coefficient of the cost function of the output of the $g^{th}$ traditional plant during the t period, Cat represents a constant term coefficient of the cost function of the output of the $g^{th}$ traditional plant during the t period, $k_{nec}$ represents a cost coefficient of abandoned wind or light, and $k_{lc}$ is a cost coefficient of load shedding.

11. A computer-readable storage medium having stored therein computer instructions that, when executed by a processor, causes the processor to:

establish a scene set considering a new energy disturbance;

establish and solving a rescheduling optimization model considering the new energy disturbance in each scene based on a preset scheduling plan according to the scene set, so as to obtain a solving result of the rescheduling optimization model;

calculate a risk quantifying and assessing result corresponding to the preset scheduling plan according to the solving result of the rescheduling optimization model; and adjust the preset scheduling plan according to the risk quantifying and assessing result to control operation of a power system;

wherein the rescheduling optimization model considering the new energy disturbance consists of an objective function and a constraint condition; the objective function is used to minimize a sum of an operation cost and a regulation cost in a current scene; and the constraint condition comprises a power balance constraint, a load shedding constraint, a network security constraint, a plant output constraint and a ramp constraint of an AGC plant;

wherein the objective function is expressed by:

$$\min\left\{ \sum\nolimits_{t=1}^{T} \sum\nolimits_{g\in G^{T}} C_{g,t}\left(P_{g,t}^{T}\right) + \right.$$

-continued $$\sum_{t=1}^{T}\sum_{w\in G^{NE}}C_{w,t}\left(P_{w,t}^{NE,cut}\right)+\sum_{t=1}^{T}\sum_{ld,t}C_{ld,t}\left(L_{ld,t}^{cut}\right)\Big\}$$

where T represents a total number of periods, $G^T$ represents a collection of traditional plants in a power system, $G^{NE}$ represents a collection of new energy plants comprising wind power plants and photovoltaic power plants in the power system, L represents a load collection in the power system, $$P_{g,t}^T$$

represents an output of a $g^{th}$ traditional plant during a t period, $$P_{w,t}^{NE,cut}$$

represents a value of abandoned wind or light of a $w^{th}$ new energy plant during the t period, $$L_{ld,t}^{cut}$$

represents a cut-off value of a $ld^{th}$ load during the t period, $$C_{g,t}\left(P_{g,t}^T\right)$$

represents a cost function of the output of the $g^{th}$ traditional plant during the t period, $$C_{w,t}\left(P_{w,t}^{NE,cut}\right)$$

represents a cost function of the abandoned wind or light of the $w^{th}$ new energy plant during the t period, and $$C_{ld,t}\left(L_{ld,t}^{cut}\right)$$

represents a cost function of load shedding of the $ld^{th}$ load during the t period;
wherein $$C_{g,t}\left(P_{g,t}^T\right) = a_{g,t}\left(P_{g,t}^T\right)^2 + b_{g,t}P_{g,t}^T + c_{g,t}$$

$$C_{w,t}\left(P_{w,t}^{NE,cut}\right) = k_{nec}P_{w,t}^{NE,cut}$$

$$C_{ld,t}\left(L_{ld,t}^{cut}\right) = k_{lc}L_{ld,t}^{cut}$$

where $a_{g,t}$ represents a quadratic term coefficient of the cost function of the output of the $g^{th}$ traditional plant during the t period, $b_{g,t}$ represents a primary term coefficient of the cost function of the output of the $g^{th}$ traditional plant during the t period, $c_{g,t}$ represents a constant term coefficient of the cost function of the output of the $g^{th}$ traditional plant during the t period, $k_{nec}$ represents a cost coefficient of abandoned wind or light, and $k_{lc}$ is a cost coefficient of load shedding.

* * * * *